United States Patent
Xie et al.

(10) Patent No.: US 9,222,007 B2
(45) Date of Patent: Dec. 29, 2015

(54) SHAPE MEMORY POLYMER WHICH FUNCTIONS AS A DRY ADHESIVE CLAMP AND METHODS OF MAKING AND USING THE SAME

(75) Inventors: Tao Xie, Troy, MI (US); Chen-Shih Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 13/613,528

(22) Filed: Sep. 13, 2012

(65) Prior Publication Data

US 2014/0072771 A1    Mar. 13, 2014

(51) Int. Cl.
| | |
|---|---|
| B32B 7/12 | (2006.01) |
| B32B 15/04 | (2006.01) |
| C09J 163/00 | (2006.01) |
| B32B 37/12 | (2006.01) |
| C08G 59/50 | (2006.01) |
| C09J 7/00 | (2006.01) |
| B32B 7/06 | (2006.01) |
| B32B 27/08 | (2006.01) |
| B32B 27/38 | (2006.01) |
| B32B 37/26 | (2006.01) |
| C08G 59/56 | (2006.01) |

(52) U.S. Cl.
CPC .............. *C09J 163/00* (2013.01); *B32B 7/06* (2013.01); *B32B 7/12* (2013.01); *B32B 27/08* (2013.01); *B32B 27/38* (2013.01); *B32B 37/1207* (2013.01); *C08G 59/502* (2013.01); *C09J 7/00* (2013.01); *B32B 37/26* (2013.01); *B32B 2037/1223* (2013.01); *B32B 2307/748* (2013.01); *B32B 2405/00* (2013.01); *C08G 59/56* (2013.01); *C09J 2201/626* (2013.01); *Y10T 428/24628* (2015.01)

(58) Field of Classification Search
CPC .................. B32B 37/1207; B32B 1/00; B32B 2037/1223; B32B 37/26; C09J 163/00; C08G 59/50
USPC ............................................... 428/343, 355 R
See application file for complete search history.

(56) References Cited

U.S. PATENT DOCUMENTS

2006/0019510 A1 * 1/2006 Rudduck et al. ................. 439/74

* cited by examiner

*Primary Examiner* — Victor Chang
(74) *Attorney, Agent, or Firm* — BrooksGroup

(57) ABSTRACT

One embodiment of the invention includes a shape memory polymer which functions similar to a traditional mechanical clamp. A shape memory polymer may exhibit adhesive properties when heated above its glass transition temperature. The shape memory polymers may function as a reversible dry adhesive clamp.

7 Claims, 4 Drawing Sheets

Jeffamine D-230 (n=2.69)

EPON 826 (n=0.085)

octadecyl amine

SHAPE MEMORY POLYMER WHICH FUNCTIONS AS A DRY ADHESIVE CLAMP AND METHODS OF MAKING AND USING THE SAME

FIELD OF THE INVENTION

The field to which the disclosure generally relates includes compositions of shape memory polymers which function as dry adhesives.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 $N/cm^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 $N/cm^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off adhesive strength of 3 and 10 $N/cm^2$ towards glass. Both adhesives suffer from severe adhesion loss after only one or two attaching/detaching cycles, as a result of breakdown and the lateral collapse of the nano structures, with the latter referring to the adjacent nano hairs of the Gecko foot pad bonding to each other. In addition, synthetic Gecko adhesives are expensive to produce and large-scale manufacturing is practically too difficult.

In some instances, shape memory polymers may exhibit material properties similar to traditional dry adhesives when heated. These shape memory polymers may exhibit desired characteristics similar to the adhesive strength, reversibility, and the ability to adapt to a variety of surfaces in terms of both the surface roughness and composition similar to that of Gecko adhesives.

SUMMARY OF EXEMPLARY EMBODIMENTS OF THE INVENTION

One embodiment of the invention includes a shape memory polymer which functions as a dry adhesive.

Another embodiment of the invention includes a product comprising a shape memory polymer which functions as a dry adhesive with a pull-off strength of up to 2000 $N/cm^2$ from a substrate.

One embodiment of the invention includes a shape memory polymer composition comprising an aliphatic diepoxy and a diamine curing agent.

One embodiment may provide an attachment pad including a shape memory polymer which functions as a reversible dry adhesive including a shape memory polymer layer; the shape memory polymer which functions as a dry adhesive having a curved surface when the shape memory polymer layer is below its glass transition temperature and unaffected by a load; and a means for evenly applying a load on the perimeter of the shape memory polymer which functions as a reversible dry adhesive including, but not limited to, a spring.

Another embodiment of the invention may include a method comprising providing a shape memory polymer which functions as a reversible dry adhesive, placing the adhesive on a surface, preloading the adhesive with the force so that the adhesive has a pull-off strength greater than 10 $N/cm^2$ from a substrate, and peeling off the adhesive using a peel-off force of 1 $N/cm^2$ or less from the same substrate.

Another embodiment of the invention may include a method comprising providing shape memory polymer which functions as a reversible dry adhesive, and utilizing the shape memory polymer which functions as a reversible dry adhesive as a temporary clamp as an alternative to a traditional mechanical clamp. The shape memory polymer may function to mechanically clamp two or more parts or objects together. Two parts may have an adhesive located at an interface between the two parts. The shape memory polymer which functions as a reversible dry adhesive may be formed around the two parts and preloaded with a force to allow the adhesive to cure while the shape memory polymer which functions as a reversible dry adhesive maintains the positions of the two parts. The shape memory polymer which functions as a reversible dry adhesive may have a pull-off strength greater than 10 $N/cm^2$ from the two parts, and a peel-off force of 1 $N/cm^2$ or less from the two parts.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention may include a shape memory polymer which may function similar to a gecko footpad. A shape memory polymer may exhibit adhesive properties when heated above its glass transition temperature. A shape memory polymer may have a rigid structure when at a temperature below its glass transition temperature. These shape memory polymers may function as reversible shape memory polymer reversible dry adhesives.

In one embodiment, the shape memory polymer which functions as a reversible dry adhesive may have a glass transition temperature $T_g$ ranging from 30 to 200° C.

One embodiment of the invention may include a shape memory polymer which functions as a dry adhesive which may be comprised of a rigid epoxy or a flexible epoxy and a crosslinking agent or a catalytic curing agent sufficient to form a reversible shape memory polymer which may function as a dry adhesive when heated above its glass transition temperature.

In one embodiment, the shape memory polymer layer may be made as follows. A first step may include mixing Bisphenol A/Epichlorohydrin epoxy resin under the trademark EPON 826 with Polyoxypropylenediamine under the trademark Jeffamine D-230 and decylamine at a mole ratio of 20:0.5:19. A second step may include pouring the mixture into a mold and curing the mixture in an oven at 100° C. for one hour. A third step may include additionally curing the mixture in an oven at 130° C. for one hour. EPON 826 and Jeffamine D-230 may be obtained from Hexion and Huntsman, respectively.

Figure 1:
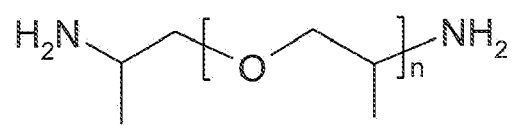
FIG. 1 illustrates the chemical structures of Polyoxypropylenediamine under the trademark Jeffamine D-230, Bisphenol A/Epichlorohydrin epoxy resin under the trademark EPON 826, and an octadecyl amine.
Figure 1:
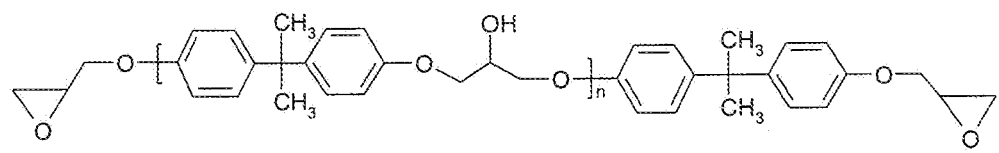
Figure 1:
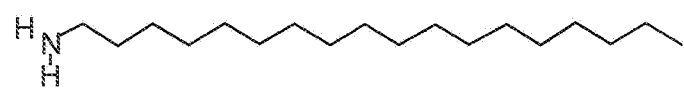

FIG. 1 illustrates the chemical structures of Jeffamine D-230, EPON 826, and an octadecyl amine.

In another embodiment, the shape memory polymer layer may be made as follows. A first step may include mixing parts A and B of CRG's Veriflex® epoxy at a ratio of 100:27.05. A second step may include pouring the mixture into a mold and curing the mixture in an oven at 120° C. for four hours. A third step may include additionally curing the mixture in an oven at 150° C. for four hours. Veriflex® epoxy may be obtained from Cornerstone Research Group, Inc. (CRG).

In one embodiment, the shape memory polymer layer may be in the shape of a rectangular, circular, or square pad having a curved structure. The curved structure may be a result of the curing process or the curved structure may also be created by specifically designed molds.

Another embodiment of the invention may include a method comprising heating a single layer shape memory polymer which functions as a dry adhesive having a rigid curved structure at room temperature and applying a load to the shape memory polymer when it is heated above the glass transition temperature of the shape memory polymer layer and cooled down under the load so that the shape memory polymer adheres to an underlying substrate. The adhered shape memory polymer may have a pull-off force greater than 10 N/cm² on a substrate. The method may also include thereafter detaching the shape memory polymer comprising heating the shape memory polymer to a temperature above the glass transition temperature of the shape memory polymer layer to cause the shape memory polymer to return to a rigid curved structure.

One embodiment of the invention may include a product comprising a shape memory polymer which functions as a dry adhesive with a pull-off strength of up to 2000 N/cm² from a substrate. Various substrates may be used to achieve a pull-off strength of up to 2000 N/cm² from a substrate.

One embodiment of the invention may include a method comprising providing a shape memory polymer which functions as a dry adhesive, placing the shape memory polymer on a surface, heating the shape memory polymer to a temperature sufficient to create adhesive characteristics on the surface of the shape memory polymer, preloading the shape memory polymer with the force so that the shape memory polymer adheres to the surface and has a pull-off strength greater than 10 N/cm² from a substrate, and a peel-off force of 1 N/cm or less from the same substrate.

Another embodiment of the invention may include a method comprising providing a shape memory polymer which functions as a dry adhesive, placing the shape memory polymer on a surface, heating the shape memory polymer to a temperature sufficient to create adhesive characteristics on the surface of the shape memory polymer, preloading the shape memory polymer with the force so that the shape memory polymer adheres to the surface and has a pull-off strength greater than 10 N/cm² from a substrate, and peeling off the shape memory polymer using a peel-off force of 1 N/cm or less from the same substrate, and repeating the attaching and peeling off steps more than six times.

Another embodiment may include a method of measuring the pull-off force to test the thermo-reversibility of the adhesion of the shape memory polymer. A bonded sample may be heated with no load to a temperature higher than the $T_g$ of the shape memory polymer. After the heating, the shape memory polymer may return to its original sample shape. The sample, after cooling down to ambient temperature under no load, may be submitted to an adhesion test. Overall, the shape memory polymer determines both the adhesive strength and thermo-reversibility of the shape memory polymer which functions as a dry adhesive.

Figure 2:
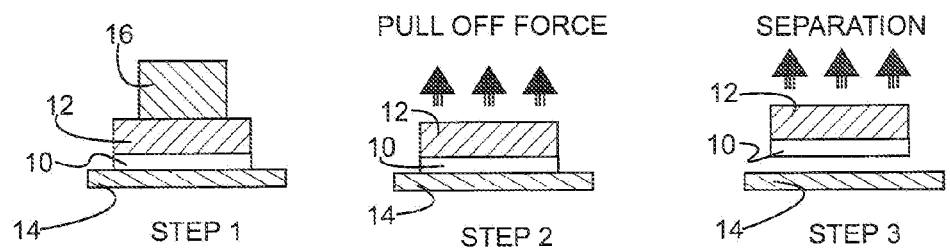
FIG. 2 illustrates a pull-off force on a rigid backing of a shape memory polymer which functions as a dry adhesive.

FIG. 2 illustrates an embodiment of a method of measuring the pull-off force of a shape memory polymer with a rigid backing is shown in FIG. 2. In STEP 1 of FIG. 2, a shape memory polymer which functions as a dry adhesive layer 10 may be affixed to a rigid backing 12. Utilizing the shape memory polymer which functions as a dry adhesive layer 10 with a rigid backing 12 may include providing a shape memory polymer which functions as a dry adhesive layer 10, placing the shape memory polymer which functions as a dry adhesive layer 10 on a substrate 14, heating the shape memory polymer which functions as a dry adhesive layer 10 to a temperature sufficient to create adhesive characteristics on the surface of the shape memory polymer, preloading the shape memory polymer which functions as a dry adhesive layer 10 and rigid backing 12 with a force 16 so that the shape memory polymer which functions as a dry adhesive layer 10 adheres to the substrate 14, and pulling off the shape memory polymer which functions as a dry adhesive layer 10 and rigid backing 12 from the substrate 14. The shape memory polymer which functions as a dry adhesive 10 may be separated from a substrate 14 with a pull-off force normal to the substrate 14. The maximum pull-off force at the point of separation may be measured by a load cell located between the shape memory polymer which functions as a dry adhesive layer 10 and the applied load 16. In one embodiment, this maximum pull-off strength may be about 60 N/cm². Unless otherwise noted, the pull-off strength may be calculated by the maximum separation force divided by the shape memory polymer surface area.

Figure 3:
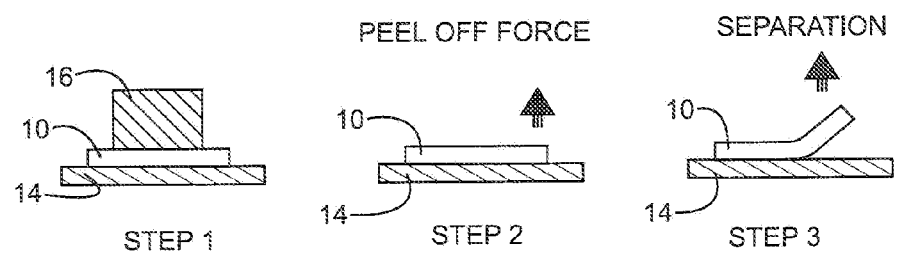
FIG. 3 illustrates a reversible shape memory polymer which functions as a dry adhesive being adhered and subsequently removed from a substrate through a peel-off method.

An embodiment of a method of utilizing a reversible shape memory polymer adhesive is depicted in FIG. 3. Utilizing the reversible shape memory polymer adhesive may comprise providing a shape memory polymer which functions as a dry adhesive layer 10, placing the shape memory polymer which functions as a dry adhesive layer 10 on a substrate 14, heating the shape memory polymer which functions as a dry adhesive layer 10 to a temperature sufficient to create adhesive characteristics on the surface of the shape memory polymer, preloading the shape memory polymer with a force 16 so that the shape memory polymer which functions as a dry adhesive layer 10 adheres to the substrate 14, and peeling off the shape memory polymer which functions as a dry adhesive layer 10 using a peel-off force of 1 N/cm or less from the same substrate 14.

Figure 4:
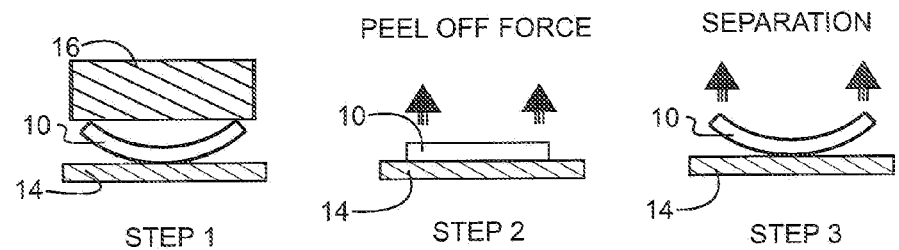
FIG. 4 illustrates a shape memory polymer which functions as a reversible dry adhesive having a curved structure being adhered and subsequently removed from a substrate through a peel-off method.

Another embodiment of the invention is depicted in FIG. 4. A reversible shape memory polymer adhesive structure 10 having a curved structure may be provided having a single adhesion layer consisting of a shape memory polymer which functions as a dry adhesive. By heating the single layer of shape memory polymer to a temperature at or higher than the glass transition temperature ($T_g$) of the reversible shape memory polymer adhesive 10, and applying a load 16 to the reversible shape memory polymer adhesive 10 while cooling to a temperature below the $T_g$ of the shape memory polymer, the reversible shape memory polymer adhesive 10 may form an adhesive bond with a substrate 14. The bond may be released by heating the reversible shape memory polymer adhesive structure 10 to a temperature above the $T_g$ of the shape memory polymer to restore the curved structure. The curved structure may be a result of the curing process of the shape memory polymer or it may be intentionally designed as such. The curved structure may facilitate a peel-off release of adhesion from the substrate.

Figure 5:
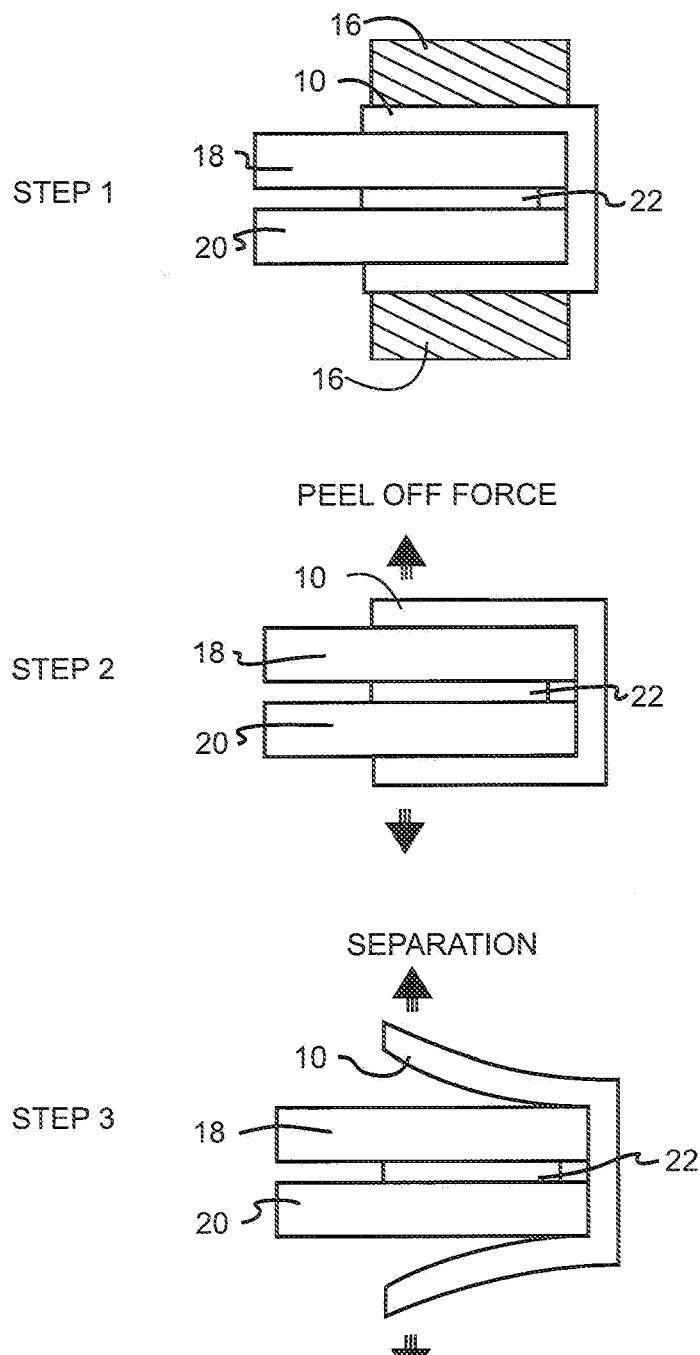
FIG. 5 illustrates a shape memory polymer which functions as a reversible dry adhesive being utilized as a flexible clamp in the process of bonding two parts via an adhesive.

Another embodiment of the invention may include a method comprising providing shape memory polymer which functions as a reversible dry adhesive and utilizing the shape memory polymer which functions as a reversible dry adhesive as a temporary clamp as an alternative to a traditional mechanical clamp, as depicted in FIG. 5. A first part 18 may have an interface with a second part 20, and an adhesive or bonding agent 22 may be located at the interface between the first and second parts. A shape memory polymer which functions as a reversible dry adhesive 10 may be formed around the first and second parts and may be heated above its glass transition temperature sufficient to exhibit adhesive characteristics. The shape memory polymer may be preloaded with a force 16 and may be cooled or be allowed to cool below its glass transition temperature to allow the adhesive 22 to cure while the shape memory polymer which functions as a reversible dry adhesive 10 maintains the positions of the two parts. The shape memory polymer which functions as a reversible dry adhesive may have a pull-off strength greater than 10 N/cm$^2$ from the two parts, and a peel-off force of 1 N/cm$^2$ or less from the two parts.

In another embodiment, the shape memory polymer which functions as a reversible dry adhesive may be utilized as a temporary clamp to clamp together a plurality of parts. The plurality of parts may be any structures which need to be bonded together, for instance, but not limited to, automotive components, aeronautics components, etc. An embodiment of the invention includes a shape memory polymer which functions as a reversible dry adhesive used to clamp two or more parts having multiple interfaces which may have adhesives or bonding agents located at the interfaces therebetween.

As depicted in FIG. 5, an embodiment of the invention may include a product comprising a shape memory polymer which functions as a reversible dry adhesive 10 which may be formed around a first part 18 and a second part 20, the first and second parts may have an interface with an adhesive or bonding agent 22 located at the interface. A preload force 16 may be applied to the shape memory polymer which functions as a reversible dry adhesive 10 while the shape memory polymer which functions as a reversible dry adhesive 10 is heated to or above its glass transition temperature sufficient to create adhesive material properties on the surface of the shape memory polymer which functions as a reversible dry adhesive 10 which may function to clamp the first part 18 and the second part 20 together. The shape memory polymer which functions as a reversible dry adhesive 10 may be allowed to cool and the preload force 16 may be removed so that the shape memory polymer which functions as a reversible dry adhesive 10 may function as a clamp. The shape memory polymer which functions as a reversible dry adhesive 10 may maintain a clamping function on the first and second parts until the adhesive located therebetween has cured. After the adhesive 22 has cured, the shape memory polymer which functions as a reversible dry adhesive 10 may be heated to or above its glass transition temperature at which point the shape memory polymer which functions as a reversible dry adhesive 10 may return to its original curved structure. By returning to its curved structure, the shape memory polymer which functions as a reversible dry adhesive 10 may un-adhere from the first and second parts via a peel-off force. The shape memory polymer which functions as a reversible dry adhesive may have a pull-off strength greater than 10 N/cm$^2$ from the first and second parts, and a peel-off force of 1 N/cm$^2$ or less from the first and second parts. The shape memory polymer which functions as a reversible dry adhesive may have a glass transition temperature $T_g$ ranging from 30 to 200° C.

Figure 6:
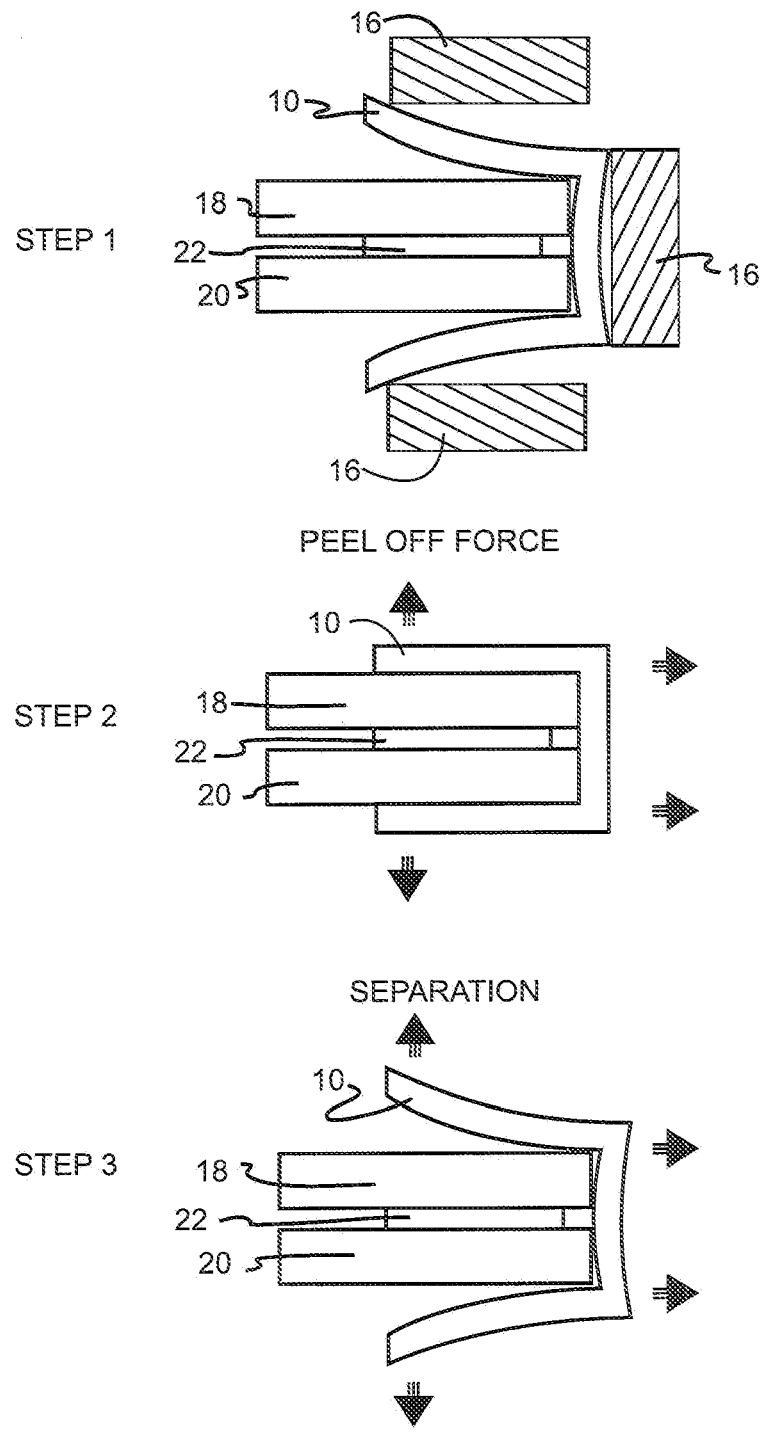
FIG. 6 illustrates a shape memory polymer which functions as a reversible dry adhesive having portions having a curved structure being utilized as a flexible clamp in the process of bonding two parts via an adhesive.

In another embodiment, the shape memory polymer which functions as a reversible dry adhesive clamp may have a curved structure or curved structural portions. As depicted in FIG. 6, a product comprising a shape memory polymer which functions as a reversible dry adhesive 10 may have a curved structure or curved structural portions and may be formed around a first part 18 and a second part 20, the first and second parts may have an interface with an adhesive or bonding agent 22 located at the interface. A preload force 16 may be applied to the shape memory polymer which functions as a reversible dry adhesive 10 while the shape memory polymer which functions as a reversible dry adhesive 10 is heated to or above its glass transition temperature sufficient to create adhesives material properties on the surface of the shape memory polymer which functions as a reversible dry adhesive 10 which may function to clamp the first part 18 and the second part 20 together. The shape memory polymer which functions as a reversible dry adhesive 10 may be allowed to cool and the preload force 16 may be removed so that the shape memory polymer which functions as a reversible dry adhesive 10 may function as a clamp. The shape memory polymer which functions as a reversible dry adhesive 10 may maintain a clamping function on the first and second parts until the adhesive located therebetween has cured. After the adhesive 22 has cured, the shape memory polymer which functions as a reversible dry adhesive 10 may be heated to or above its glass transition temperature at which point the shape memory polymer which functions as a reversible dry adhesive 10 may return to its original curved structure. By returning to its curved structure, the shape memory polymer which functions as a reversible dry adhesive 10 may un adhere from the first and second parts via a peel-off force. The shape memory polymer which functions as a reversible dry adhesive may have a pull-off strength greater than 10 N/cm$^2$ from the first and second parts, and a peel-off force of 1 N/cm$^2$ or less from the first and second parts. The shape memory polymer which functions as a reversible dry adhesive may have a glass transition temperature $T_g$ ranging from 30 to 200° C.

According to an additional embodiment of the invention, a curved structure may be provided consisting of a layer of shape memory polymer which functions as a dry adhesive. By heating to a temperature higher than the glass transition temperature ($T_g$) of the shape memory polymer, and imposing a load while cooling to a temperature below the $T_g$ of the shape memory polymer, the single layer structure may form a strong adhesive bond with a stainless steel substrate with a pull-off force of about 60 N/cm². The strong bond may be automatically released by heating the single layer structure to a temperature above the $T_g$ of the shape memory polymer to restore the curvature.

For a shape memory polymer which functions as a reversible dry adhesive, a minimum preload may be required to achieve maximum contact between the shape memory polymer and a substrate, and therefore to achieve a maximum pull-off force.

One embodiment may provide a shape memory polymer which exhibits adhesive surface properties when heated above its glass transition temperature. The shape memory polymer may allow the single layer structure to deform and adapt to the profile of a counter surface upon heating. The shape memory polymer layer may further allow the deformed shape to be maintained after cooling. As a result, a macroscopically near perfect contact with the counter surface may be achieved, which may lead to the pull-off strength of about 2000 N/cm² from a substrate. The SMP layer may not only be responsible for maximizing the surface contact but also the intrinsic adhesion to a substrate.

The adhesion reversal for the shape memory polymer which functions as a dry adhesive may be accomplished via heating. In one embodiment, the shape recovery of the shape memory polymer may occur upon heating despite the large pull-off strength measured between the shape memory polymer and a substrate due to a curved structure of the shape memory polymer. During the shape recovery process to return to an original curvature, the interfacial separation may start from the edge and gradually propagated to the center of the shape memory polymer layer. In a way, this is a peeling process or more precisely a self-peeling process. In this case, neither the large pull-off strength nor the magnitude of the recovery force of the SMP is relevant. Indeed, since the SMP may be soft at a temperature above its $T_g$, it may naturally allow the separation to occur in a peel-off mode.

The thermal reversibility of the adhesion for the shape memory polymer has important implications. A natural gecko controls its adhesion and the reversal process through its mechanical toe actions. A synthetic gecko adhesive at its best mimics only a gecko footpad, not the mechanical toe actions. For a synthetic gecko adhesive, when good adhesion is needed, accidental peeling should be avoided in which case a rigid backing layer may be desirable in principle. The rigid backing layer, however, would not allow peeling actions needed for the adhesion reversal/detachment. Unless a mechanical device is introduced to mimic mechanical gecko toe actions, the above paradox is difficult to avoid.

In another embodiment, a shape memory polymer which functions as a dry adhesive may be rigid below its glass transition and the rigidity may inhibit unwanted peeling to ensure good adhesion. The shape memory polymer may also become flexible at temperatures above its $T_g$, allowing peeling for adhesion reversal. Even when the shape memory polymer is cooled down to a temperature below its $T_g$ after its shape recovery, the curvature may result in a 10 times drop in the pull-off strength. Thus, the controllability of the shape memory polymer adhesion may be controlled two-fold: 1) the thermal transition of the shape memory polymer from being rigid to flexible turns the ability to peel on and off, in this case, the curvature is not required; and 2) the shape recovery ability and the original curved structure may create a self-peeling mechanism to control the contact area, thus the adhesion. A naturally curved shape memory polymer may allow the second controlling mechanism to occur. Curvatures created by purposeful mold design may have the same effect. This general approach of using a shape memory polymer to control the adhesion and adhesion reversal may be applied to effectively replicate gecko toe adhesion. The adhesion reversal triggering temperature may be adjustable based on the $T_g$ of the shape memory polymer selected.

The following examples of shape memory polymers are for illustrative purposes only and are not meant to limit the invention in any way.

In various embodiments, the components of a shape memory polymer may include a rigid epoxy and a flexible epoxy. The range of possible crosslinking chemistries which may be used to achieve shape memory polymer may include alpha, omega-diaminoalkanes, anhydride, or catalytic (as in imidazole type) crosslinking reactions. There are many different ways to achieve the appropriate relationships between the molecular properties. For example, the shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) may promote epoxy-to-epoxy or epoxy-to-hydroxyl reactions. The catalytic curing agent may include, but is not limited to, tertiary amines, amine salts, boron trifluoride complexes, or amine borates. The components of the shape memory polymer may be present in an amount sufficient to provide, upon curing of the composition, a shape memory polymer having a glass transition temperature of −90° C. to 200° C. and having a pull-off strength of up to 2000 N/cm² from a substrate. In one embodiment, the components of the shape memory polymer composition may be present in an amount sufficient to provide, upon curing of the composition, a shape memory polymer having a change in storage modulus of 2 to 3 orders of magnitude before and after its glass transition. In one embodiment, the components of the shape memory polymer composition may be present in an amount sufficient to provide a shape memory polymer with adhesive material properties when heated above its glass transition temperature.

The above description of embodiments of the invention is merely exemplary in nature and, thus, variations thereof are not to be regarded as a departure from the spirit and scope of the invention.

What is claimed is:

1. A product comprising:
   a shape memory polymer which functions as a reversible dry adhesive comprising a shape memory polymer composition which exhibits adhesive properties when heated above its glass transition temperature wherein the shape memory polymer composition comprises a mixture of Bisphenol A/Epichlorohydrin epoxy resin with Polyoxypropylenediamine and octadecyl amine, at a mole ratio of 20:0.5:19;

wherein the shape memory polymer which functions as a reversible dry adhesive may be formed around a first part and a second part under a preload force to form a temporary mechanical clamp; and the shape memory polymer which functions as a reversible dry adhesive further comprising a curved structure sufficient to facilitate a peel-off release of adhesion from the first part and the second part when the reversible shape memory polymer which functions as a dry adhesive is heated to or above its glass transition temperature.

2. The product of claim 1:

wherein the first and second parts may have an interface therebetween and an adhesive may be located at the interface between the first part and the second part.

3. The product of claim 1:

wherein the glass transition temperature ranges from about 30° Celsius to about 300° Celsius.

4. The product of claim 1:

wherein the reversible shape memory polymer which functions as a dry adhesive has a pull-off force of up to 2000 $N/cm^2$ from a substrate.

5. The product of claim 1:

wherein the shape memory polymer which functions as a reversible dry adhesive may be in the shape of a rectangular, circular, or square pad having a curved structure.

6. The product of claim 1:

wherein the shape memory polymer which functions as a reversible dry adhesive may be rigid below its glass transition temperature.

7. The product of claim 1:

wherein the shape memory polymer layer may have a curved structure below its glass transition temperature and unaffected by a load.

* * * * *